(12) United States Patent
Ichihara et al.

(10) Patent No.: US 7,843,803 B2
(45) Date of Patent: Nov. 30, 2010

(54) ORTHOGONAL FREQUENCY DIVISION MULTIPLEX MODEM CIRCUIT

(75) Inventors: Masaki Ichihara, Tokyo (JP); Yukitsuna Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 872 days.

(21) Appl. No.: 11/441,257

(22) Filed: May 25, 2006

(65) Prior Publication Data

US 2006/0209673 A1 Sep. 21, 2006

Related U.S. Application Data

(63) Continuation of application No. 09/879,323, filed on Jun. 12, 2001, now Pat. No. 7,099,268.

(30) Foreign Application Priority Data

Jun. 14, 2000 (JP) .............................. 2000/177711

(51) Int. Cl.
*H04J 11/00* (2006.01)
(52) U.S. Cl. ..................... 370/208; 370/210; 375/260
(58) Field of Classification Search .................. None
See application file for complete search history.

(56) References Cited

U.S. PATENT DOCUMENTS

| | | |
|---|---|---|
| 5,488,632 A | 1/1996 | Mason et al. |
| 5,555,268 A | 9/1996 | Fattouche et al. |
| 5,771,224 A | 6/1998 | Seki et al. |
| 6,038,450 A | 3/2000 | Brink et al. |
| 6,192,068 B1 * | 2/2001 | Fattouche et al. ........... 375/130 |
| 6,195,534 B1 | 2/2001 | Sakoda et al. |

(Continued)

FOREIGN PATENT DOCUMENTS

CN 1218358 6/1999

(Continued)

OTHER PUBLICATIONS

Wong et al., "Multiuser OFDM With Adaptive Subcarrier, Bit and Power Allocation", IEEE Journal on Selected Areas in Communications, vol. 17, No. 10, Oct. 1999, pp. 1747-1758.

(Continued)

*Primary Examiner*—Bob A Phunkulh
(74) *Attorney, Agent, or Firm*—Scully, Scott, Murphy & Presser, P.C.

(57) ABSTRACT

To provide an orthogonal frequency division multiplex modem circuit which can multiplex signals, whose bit rates and QoS are different from one another, and can transmit the signals via one OFDM line. A serial/parallel converter converts input signals into a complex parallel signal respectively, and a sub carrier and a modulation system are assigned every communication channel. A randomizer changes the alignment sequence of the signal, a discrete inverse Fourier transformer processes the signal, a parallel/serial converter converts the signal into a serial signal, and a transmitter performs the orthogonal modulation of the signal to output the signal from an antenna. A receiver performs orthogonal demodulation of the signal received with an antenna, a serial/parallel converter converts the signal into a parallel signal, and a discrete Fourier transformer processes the parallel signal. In addition, a de-randomizer restores the alignment sequence of the subcarriers into the original condition, and a parallel/serial converter decodes and outputs the signal.

42 Claims, 11 Drawing Sheets

U.S. PATENT DOCUMENTS

| | | |
|---|---|---|
| 6,246,713 B1 | 6/2001 | Mattisson |
| 6,397,368 B1 | 5/2002 | Yonge, III et al. |
| 6,400,781 B1 | 6/2002 | Vandendorpe et al. |
| 6,430,148 B1 | 8/2002 | Ring |
| 6,442,129 B1 | 8/2002 | Yonge, III et al. |
| 6,542,460 B1 | 4/2003 | Ring |
| 6,628,673 B1 | 9/2003 | McFarland et al. |
| 6,726,297 B1 | 4/2004 | Uesugi |
| 6,807,146 B1 | 10/2004 | McFarland |
| 6,816,453 B1 * | 11/2004 | Sakamoto ................ 370/210 |

FOREIGN PATENT DOCUMENTS

| | | |
|---|---|---|
| EP | 0753947 A1 | 1/1997 |
| EP | 0 891 067 A2 | 1/1999 |
| EP | 902551 A1 | 3/1999 |
| GB | 2332603 A | 6/1999 |
| JP | 8-331093 | 12/1996 |
| JP | 10-336139 | 12/1998 |
| JP | 11-266224 | 9/1999 |
| JP | 11-317723 | 11/1999 |
| JP | 2000-92009 | 3/2000 |
| KR | 2000-0029653 | 5/2000 |
| WO | WO 96/37062 | 11/1996 |
| WO | WO 97/48197 | 12/1997 |
| WO | WO 98/57472 | 12/1998 |

OTHER PUBLICATIONS

Suhas N. Diggavi, "Multiuser DMT: A Multiple Access Modulation Scheme", IEEE, 1996, pp. 1566-1570.

Sollenberger, et al., "Receiver Structures for Multiple Access OFDM", IEEE, pp. 468-472, 1999.

Longxiang, et al, "The Adaptive Modulation Technology for High Capacity Wireless TDMA Communications Systems", pp. 27-29, 1999, (www.cnki.net.).

Hoo et al., "Digital Dual Qos Loading Algorithms for Multicarrier Systems", IEEE International Conference, vol. 2, Jun. 6-10, 1999 (pp. 796-800, vol. 2.

Kunihiro, Takushi et al., "BDMA Testbed-Configuration and Performance Results", Vehicular Technology Conference (1999) IEEE, pp. 1836-1840.

* cited by examiner

ORTHOGONAL FREQUENCY DIVISION MULTIPLEX MODEM CIRCUIT

CROSS REFERENCE TO RELATED APPLICATION

The present application is a continuation application of Ser. No. 09/879,323 filed on Jun. 12, 2001 now U.S. Pat. No. 7,099,268.

BACKGROUND OF THE INVENTION

1. Field of the Invention

The present invention relates to an orthogonal frequency division multiplex modem circuit, and in particular, to an OFDM (Orthogonal Frequency Division Multiplex) modem circuit which transmits a plurality of different channels.

2. Description of the Related Art

In recent years, the digitization of broadcasting has been promoted and an OFDM system will be adopted as its modulation system. Moreover, also in a 5-GHz-band wireless LAN (Local Area Network), the OFDM system is adopted as a modulation system.

The OFDM system is a system that divides a transmission signal into pieces, and modulates and transmits a plenty of subcarriers respectively, and has characteristics that the OFDM system has high frequency utilization efficiency and is strong on multi-path fading.

FIG. 10 shows an example of the structure of a conventional orthogonal frequency division multiplex modem circuit. A principle of the above-described OFDM system will be explained with using FIG. 10. First, a transmission signal X is a signal for, for example, digital high-definition television broadcasting, and consists of a 20-Mbps data signal and a 10.72-Mbps overhead (signal for error correction and synchronization control). That is, the transmission signal X is 30.72 Mbps in total.

A 4×512-bit parallel data is generated by passing this signal through a serial/parallel converter (S/P) 101, and the data is divided every 4 bits. Owing to this, a 16-value QAM (Quadrature Amplitude Modulation) baseband signal A is generated.

The 16-value QAM baseband signal A is complex data having a real part (Re) and an imaginary part (Im). Correspondence between each signal point on a complex plane and a 4-bit input signal is shown in FIG. 11.

Owing to this, 512 complex 16-value QAM signals A, each of whose symbol rates is 30.72/4/512 Msps=15 ksps, are outputted. When these 512 complex numbers are inputted into an inverse Fourier transformer (IFFT) 105, 512 sets of transformation results B are obtained. These results B are converted into a serial signal C with a parallel/serial converter (P/S) 106.

With making real parts before transformation be an I signal and making imaginary parts be a Q signal, these signals are outputted to a transmitter (TX) 107 at a sample rate of 15 ksps×512=7.68 Msps. The transmitter 107 performs the orthogonal modulation of the I and Q baseband signals, and outputs them from an antenna 115.

The allocation of the subcarriers in a transmitter signal is shown in FIG. 12. As shown in FIG. 12, each interval between subcarriers is equal to the symbol rate of 15 kHz and the number of subcarriers is 512. Therefore, bandwidth is 15 kHz×512=7.68 MHz.

Next, the structure of a receiving side will be described. In the receiving side, a high frequency signal transmitted from the transmitting side is received with an antenna 116, a receiver (RX) 108 performs an orthogonal demodulation to generate a baseband signal (I, Q) D. A serial parallel converter (S/P) 109 samples this signal at the rate of 7.68 Msps respectively, and generates a parallel signal E consisting of 512 sets of I (real part) and Q (imaginary part) signals. When this signal is inputted into a discrete Fourier transformer (FFT) 110, 512 complex numbers are obtained.

This data F expresses a signal point of each corresponding sub carrier on a complex plane. A corresponding 4-bit data (in the case of a 16-value QAM) is reproduced from this signal point, and is decoded into the original signal Y and outputted with a parallel/serial converter (P/S) 112.

As described above, the bit rate transmitted in the OFDM system is very high-speed, for example, 30.72 Mbps. This is divided into many subcarriers and transmitted. When the number of subcarriers is 512 and a modulation system is the 16-value QAM, a symbol rate per sub carrier becomes only 15 ksps. The duration per one symbol is about 67 μsec, and this is a sufficiently large value (this is equivalent to 20 km) in comparison with the path difference of a usual multi-path. Therefore, the OFDM system has powerful resistance to multi-path transmission.

The OFDM system is now planned with premising the utilization of each single unit such as digital television broadcast and high-speed wireless LAN equipment. However, since the OFDM system has a feature of being essentially strong on the multi-path transmission, this feature is attractive also in other mobile communications.

Therefore, as a natural conclusion, it can be thought that demands for using the OFDM system also for mobile communications come out. However, since the OFDM system realizes vast transmission capacity as a whole by using hundreds of subcarriers, it is not allowed to use this monopolistically by one kind of mobile communication.

Therefore, it is possible to transmit various communications, such as digital TV, wireless LAN, the Internet, and cellular phones, via one OFDM line. The plural kinds of communication signals have different bit rates respectively, and their necessary transmission quality (QoS: Quality of Service) are different according to informational types.

That is, there are various transmission rates (for example, 28.8 kbps, 1.44 Mbps, and 10 Mbps) in data communication, and, an error rate not higher than 10E-6 is required. On the other hand, in speech communication such as a telephone, a transmission rate is 13 kbps or the like, and the error rate of 10E-3 is regarded as sufficient quality.

SUMMARY OF THE INVENTION

Then, an object of the present invention is to solve the above-described troubles, and to provide an orthogonal frequency division multiplex modem circuit which can multiplex signals, whose bit rates and QoS are different from one another, and can transmit the signals via one OFDM line.

An orthogonal frequency division multiplex modem circuit according to the present invention is an orthogonal frequency division multiplex modem circuit that uses a plurality of subcarriers for communication, and transmits and receives a plurality of communication channels. In the circuit, each of a plurality of sub carrier groups into which the plurality of subcarriers is divided is assigned to each of the plurality of communication channels.

That is, the orthogonal frequency division multiplex modem circuit according to the present invention provides a method for multiplexing and transmitting a plurality of communication channels whose bit rates and QoS (Quality of Service) are different from one another, via one OFDM (Orthogonal Frequency Division Multiplex) line.

In order to achieve this, a first orthogonal frequency division multiplex modem circuit according to the present invention is characterized in that performing communications with using a plurality of subcarriers, dividing the plurality of subcarriers into a plurality of groups in an OFDM system which transmits and receives a plurality of communication channels, and assigning the sub carrier groups to the plurality of communication channels respectively.

A second orthogonal frequency division multiplex modem circuit according to the present invention is characterized in that the assignment of sub carrier groups to respective communication channel is adaptively performed.

A third orthogonal frequency division multiplex modem circuit according to the present invention is characterized in that a modulation system given to each of the sub carrier groups is changed according to the QoS (Quality of Service) needed for a corresponding communication channel.

A fourth orthogonal frequency division multiplex modem circuit according to the present invention is characterized in that means for randomizing the alignment of the respective subcarriers on a frequency axis is included in a transmitting side, and that means for de-randomizing the alignment is included in a receiving side.

A fifth orthogonal frequency division multiplex modem circuit according to the present invention is characterized in that all subcarriers are assigned to a single channel as required, while communication of other channels is stopped.

A sixth orthogonal frequency division multiplex modem circuit according to the present invention is characterized in that the changeable modulation system that is described above uses phase modulation such as BPSK (Binary Phase Shift Keying), QPSK (Quadrature Phase Shift Keying), and QAM (Quadrature Amplitude Modulation), and a symbol point on a phase plane is changed according to the QoS.

A seventh orthogonal frequency division multiplex modem circuit according to the present invention is characterized in that, since it is desirable for the transmitted power of each sub carrier to be uniform, a peak value of each modulation symbol is determined so that the transmission power of the respective subcarriers may become the same irrespective of the modulation system.

An eighth orthogonal frequency division multiplex modem circuit according to the present invention is characterized in that the processing for randomizing positions of respective subcarriers is updated every symbol as means for preventing the suppression of a specific sub carrier caused by frequency-selective fading.

A ninth orthogonal frequency division multiplex modem circuit according to the present invention is characterized in comprising means for determining a randomization pattern every symbol and transmitting the randomization pattern every symbol to the receiving side is included in the transmitting side, and means for synchronizing transmission and reception of the randomization pattern is included.

A tenth orthogonal frequency division multiplex modem circuit according to the present invention is characterized in that the orthogonal frequency division multiplex modem circuit comprises means for determining a randomization pattern every symbol and transmitting the randomization pattern every symbol to the receiving side is included in the transmitting side, and that a predetermined communication channel and a sub carrier corresponding to it are assigned as the means for synchronizing transmission and reception of the randomization pattern.

An eleventh orthogonal frequency division multiplex modem circuit according to the present invention is characterized in that a predetermined communication channel and a sub carrier corresponding thereto is excluded from randomization process.

Owing to the above-described structure and processing operation, the orthogonal frequency division multiplex modem circuits of the present invention can transmit communication channels whose bit rates and QoS are different from one another with using one OFDM line.

DESCRIPTION OF THE PREFERRED EMBODIMENT

Figure 1:
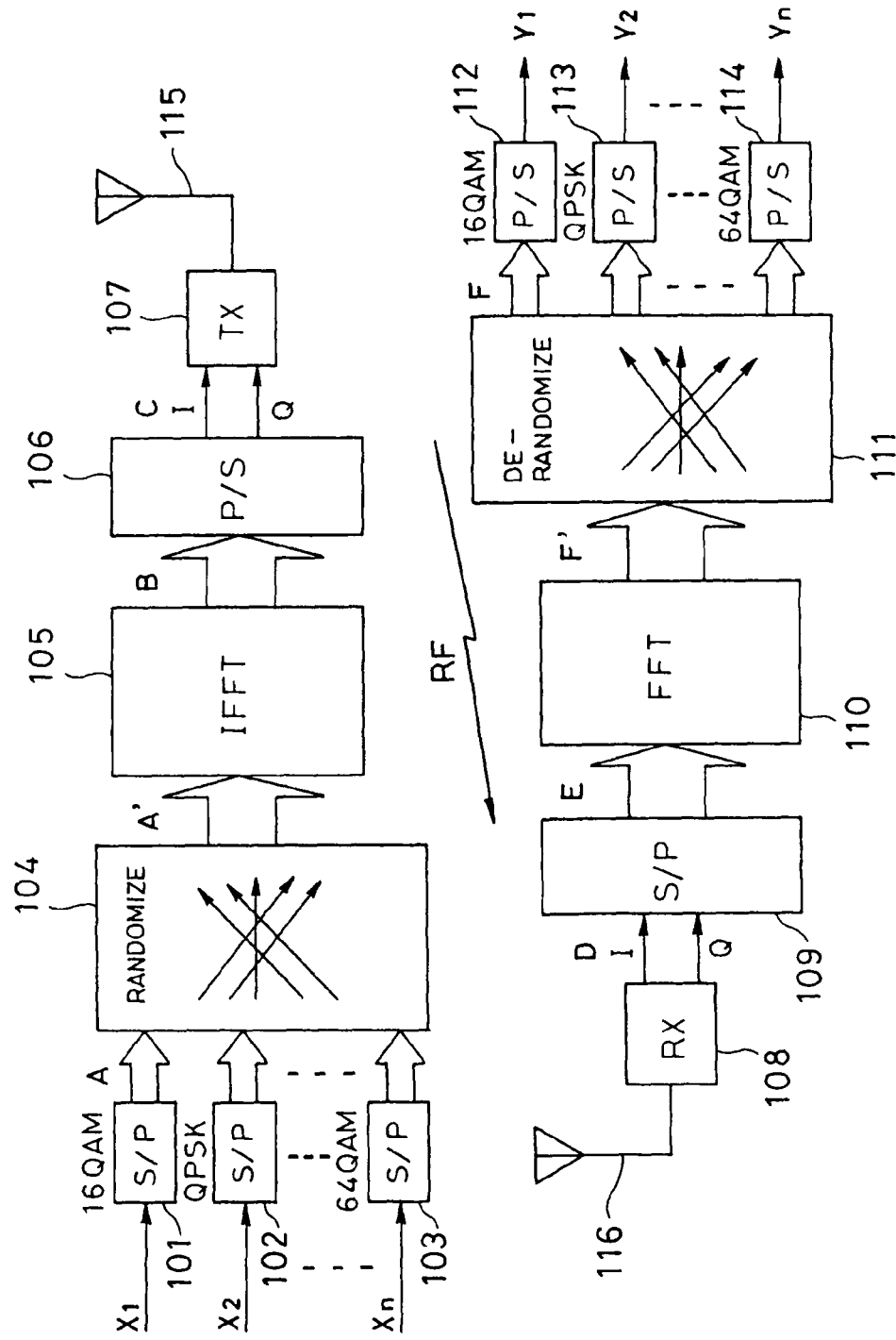
FIG. 1 is a block diagram showing the structure of an orthogonal frequency division multiplex modem circuit according to an embodiment of the present invention.

Next, embodiments of the present invention will be described with reference to drawings. FIG. 1 is a block diagram showing the structure of an orthogonal frequency division multiplex modem circuit according to an embodiment of the present invention. In FIG. 1, the orthogonal frequency division multiplex modem circuit according to this embodiment of the present invention comprises a transmitting side consisting of serial/parallel converters (S/P) 101,102, and 103, a randomizer 104, a discrete inverse Fourier transformer (IFFT) 105, a parallel/serial converter (P/S) 106, and a transmitter (TX) 107, and a receiving side consisting of a receiver (RX) 108, a serial/parallel converter (S/P) 109, a discrete Fourier transformer (FFT) 110, a de-randomizer 111, and parallel/serial converters (P/S) 112, 113, and 114.

Figure 2:
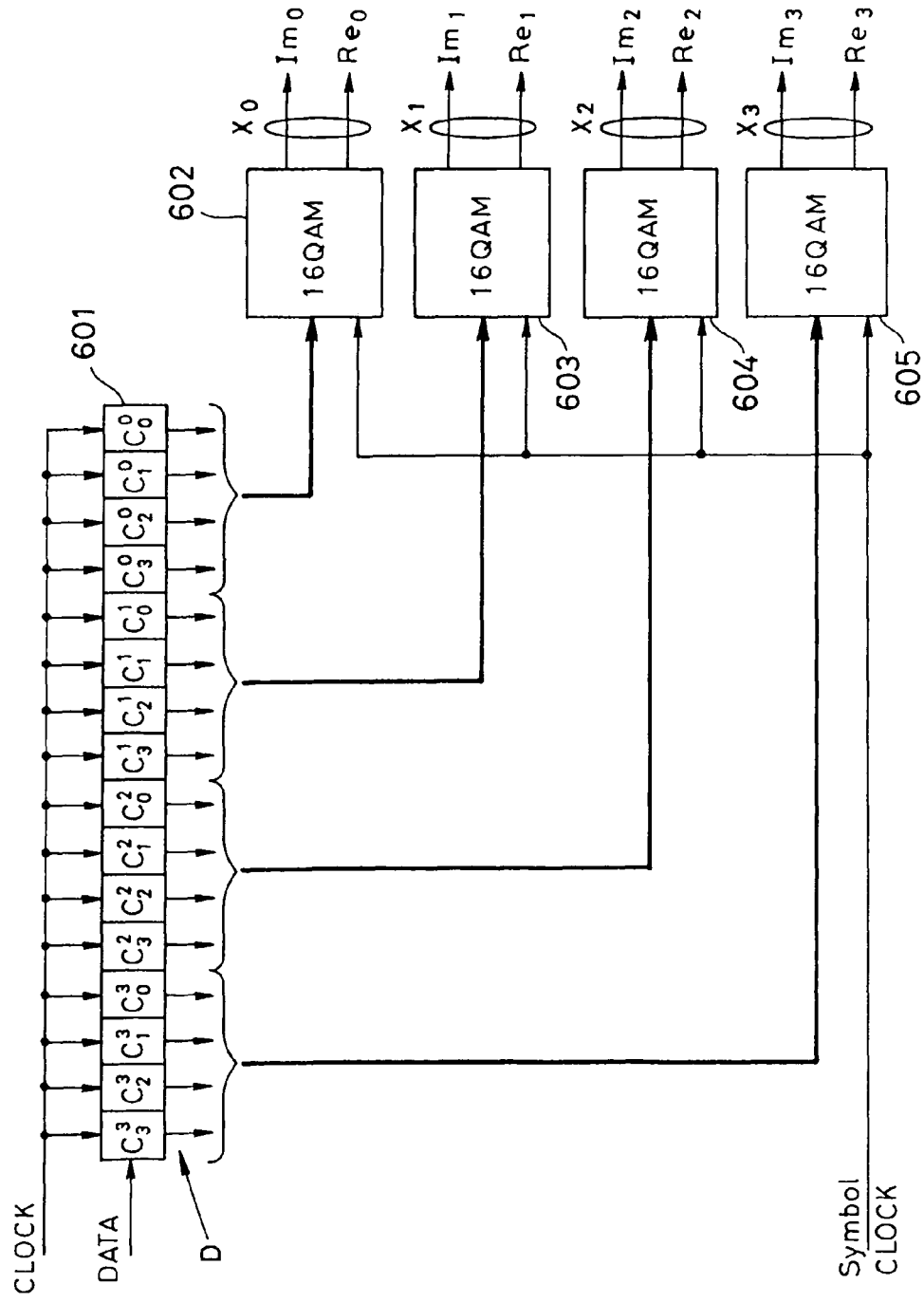
FIG. 2 is a block diagram showing a structural example of the serial/parallel converter shown in FIG. 1.

FIG. 2 is a block diagram showing a structural example of the serial/parallel converter 101 shown in FIG. 1. In FIG. 2, the serial/parallel converter 101 consists of a shift register 601 and 16-value QAM (Quadrature Amplitude Modulation) generating circuits 602, 603, 604, and 605.

Figure 3:
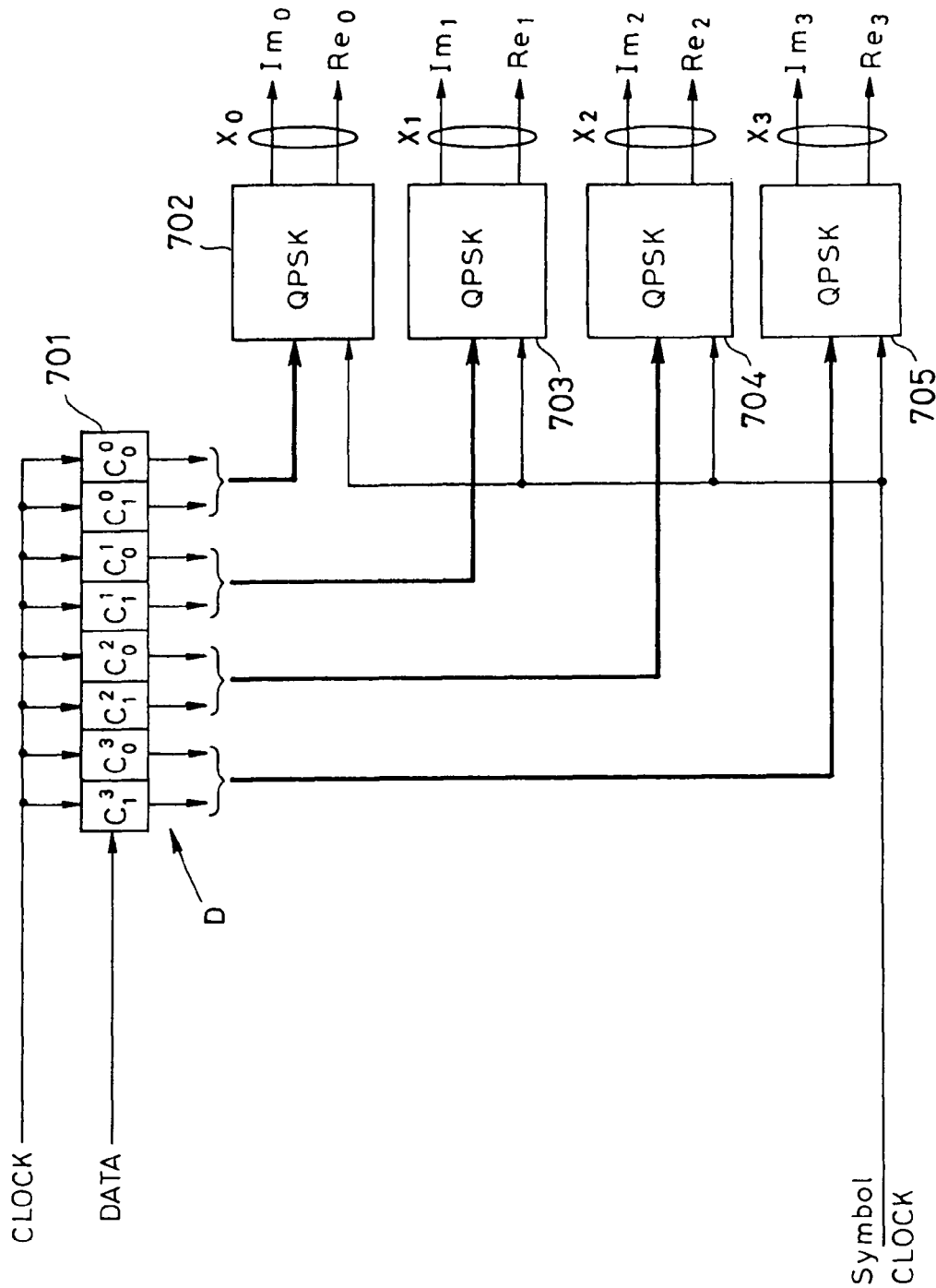
FIG. 3 is a block diagram showing a structural example of the serial/parallel converter shown in FIG. 1.

FIG. 3 is a block diagram showing a structural example of the serial/parallel converter 102 shown in FIG. 1. In FIG. 3, the serial/parallel converter 102 consists of a shift register 701 and QPSK (Quadrature Phase Shift Keying) generating circuits 702, 703, 704, and 705.

Figure 4:
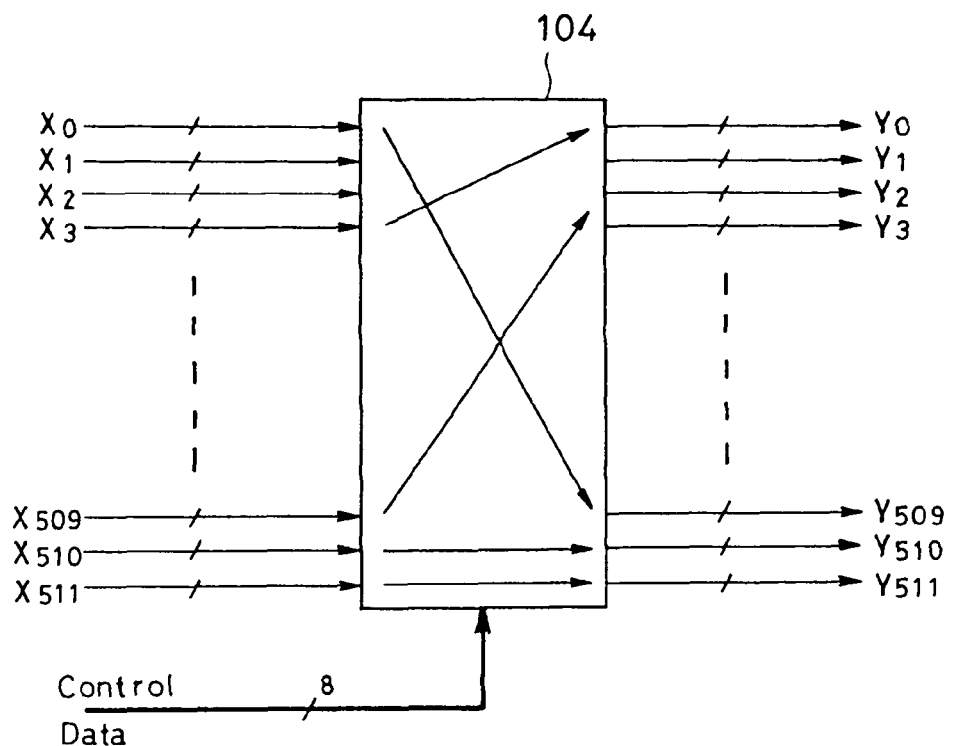
FIG. 4 is a diagram for explaining the randomizer of FIG. 1.
Figure 5:
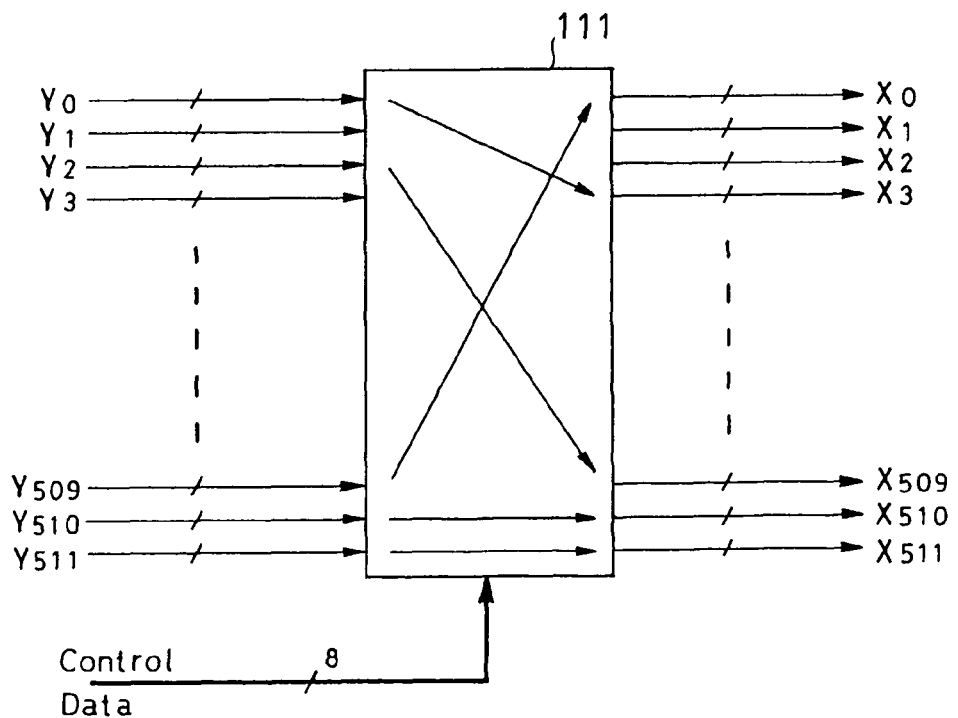
FIG. 5 is a diagram for explaining the de-randomizer of FIG. 1.
Figure 6:
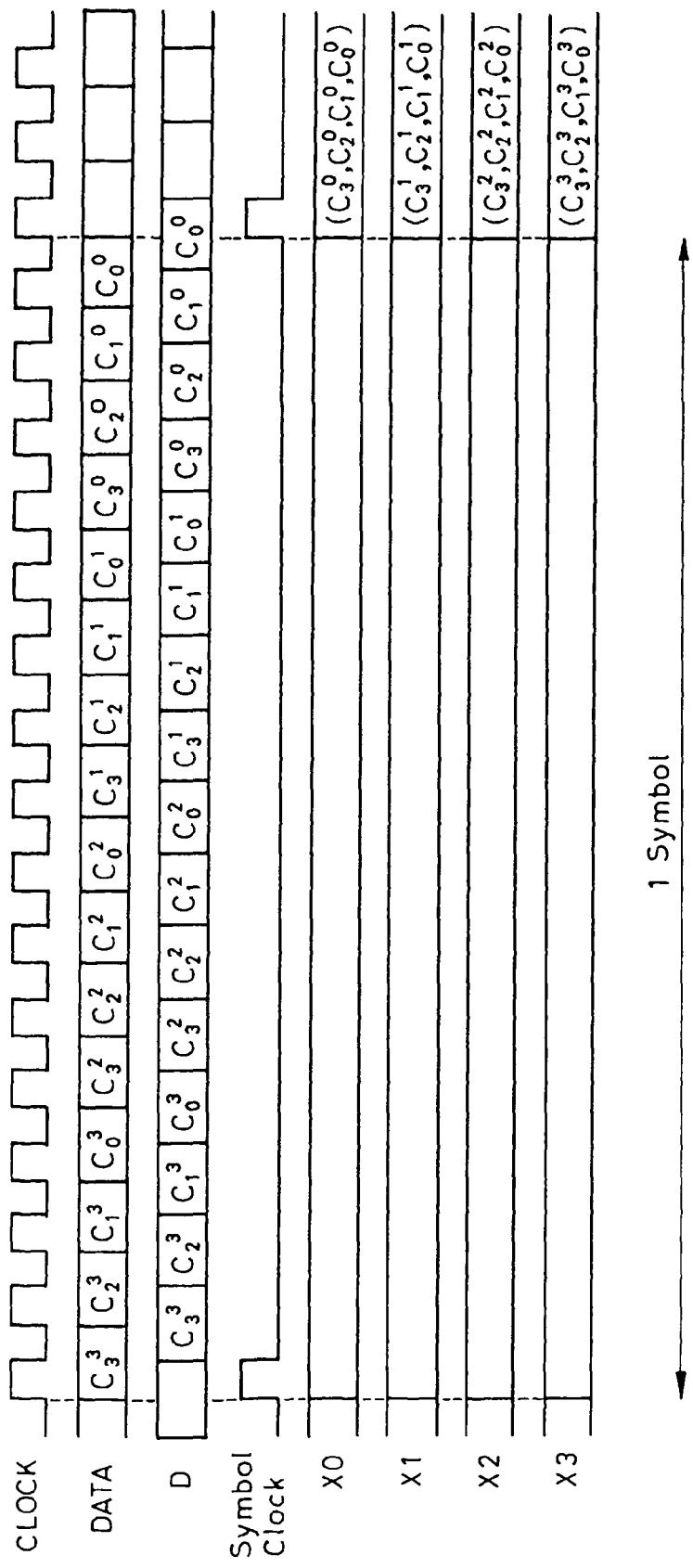
FIG. 6 is a time chart showing the operation of the serial/parallel converter of FIG. 2.
Figure 7:
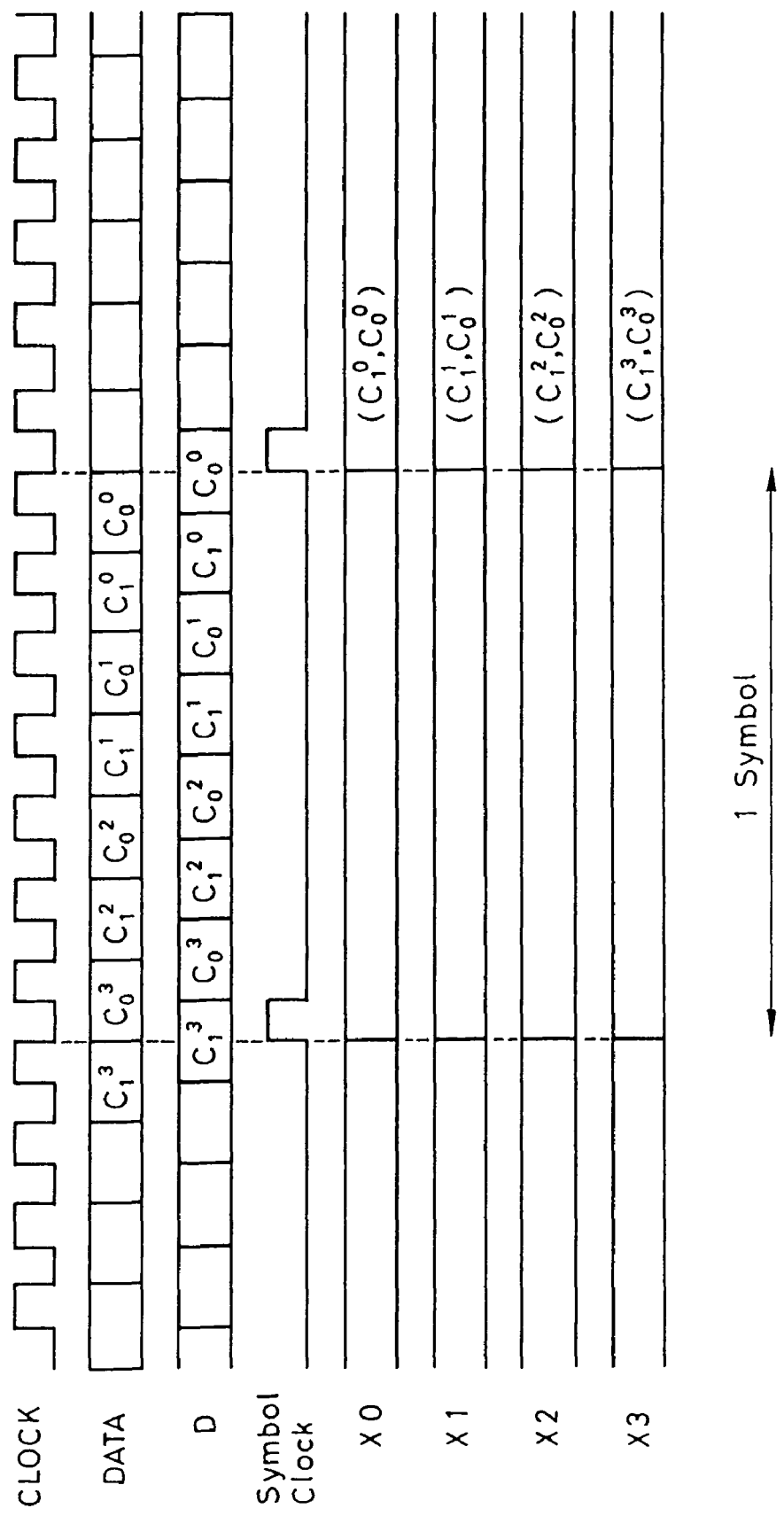
FIG. 7 is a time chart showing the operation of the serial/parallel converter of FIG. 3.
Figure 8:
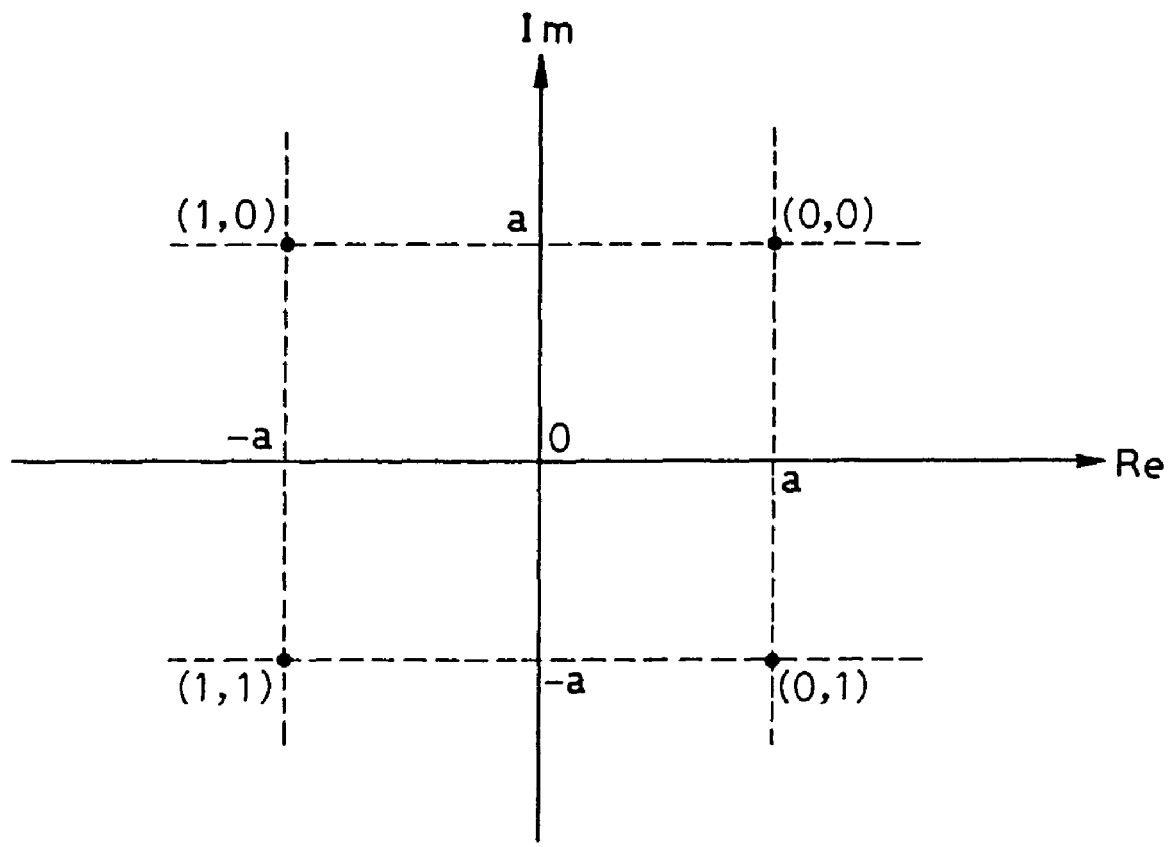
FIG. 8 is a graph showing symbol points on a complex plane.

FIG. 4 is a drawing for explaining the randomizer 104 shown in FIG. 1, and FIG. 5 is a drawing for explaining the de-randomizer 111 shown in FIG. 1. FIG. 6 is a time chart showing the operation of the serial/parallel converter 101 shown in FIG. 2, and FIG. 7 is a time chart showing the operation of the serial/parallel converter 102 shown in FIG. 3. In addition, FIG. 8 is a graph showing symbol points on a complex plane. With reference to these FIGS. 1 to 8, the operation of the orthogonal frequency division multiplex modem circuit according to this embodiment of the present invention will be described.

Figure 10:
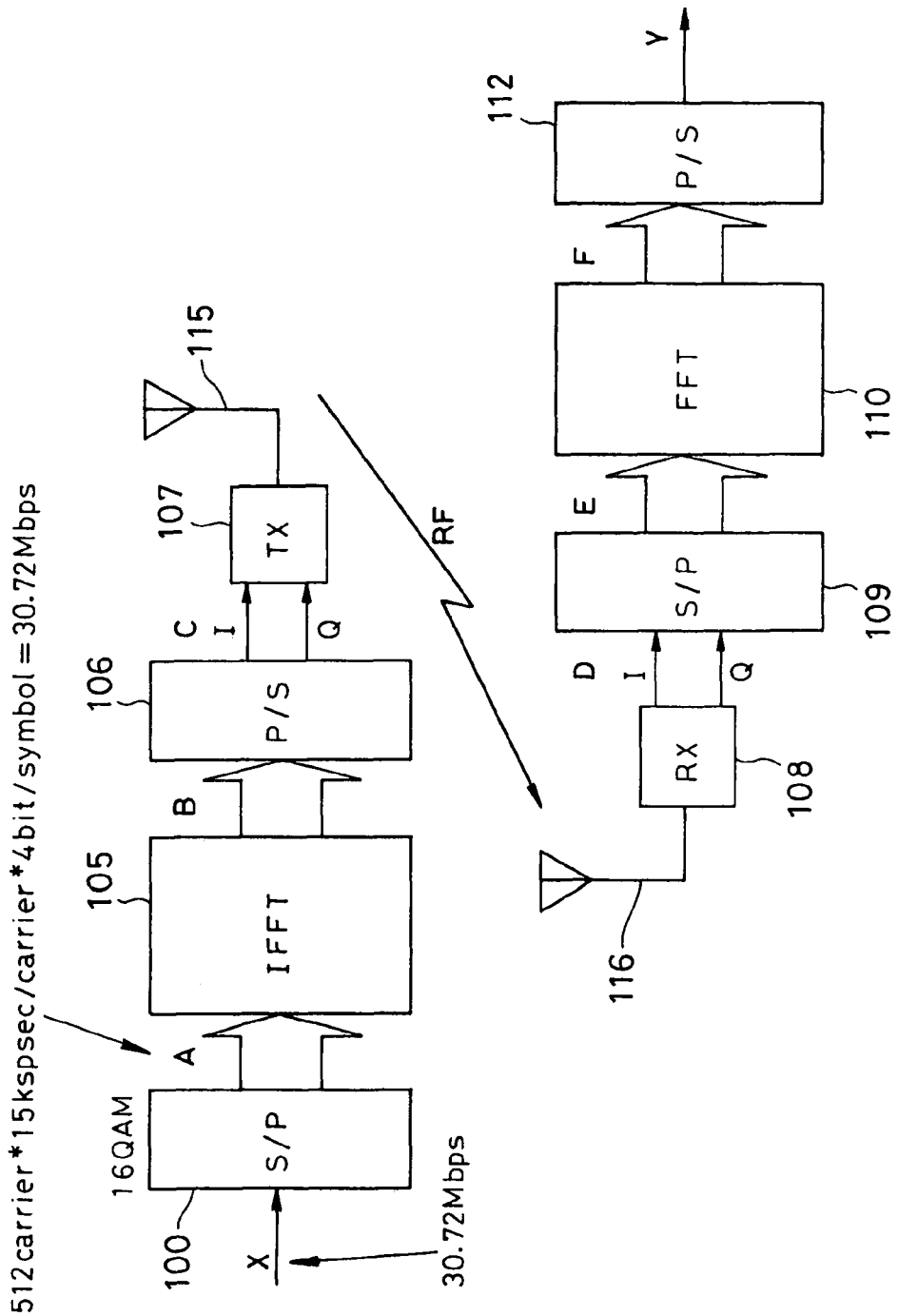
FIG. 10 is a block diagram showing the structure of a orthogonal frequency division multiplex modem circuit according to a conventional example;.

Differently from the conventional example of the orthogonal frequency division multiplex modem circuit shown in FIG. 10, the orthogonal frequency division multiplex modem circuit according to this embodiment of the present invention has a plurality of data inputs X1, X2, ..., Xn in the transmitting side, and has a plurality of data outputs Y1, Y2, ..., Yn, corresponding thereto, also in the receiving side.

The input signals X1, X2, ..., Xn are converted into a complex parallel signal A with the serial/parallel converters 101, 102, and 103 respectively. For example, the input signal X1 is inputted at the bit rate of 240 kbps. If the QoS of the input signal X1 is a middle degree, four subcarriers are assigned, and an output of the serial/parallel converter 101 becomes four complex numbers (it corresponded to four subcarriers) at 15 ksps in the case that a modulation system is the 16-value QAM, In the serial/parallel converter 101 generating the 16-value QAM, as shown in FIG. 2, data is inputted into the shift register 601 driven by a clock having a frequency equal to the data rate. The 4-bit parallel outputs of the shift register 601 are a group at a time, and are inputted into the 16-value QAM generating circuits 602, 603, 604, 605 respectively to be incorporated with a clock (Symbol CLOCK) equal to the symbol rate.

Figure 11:
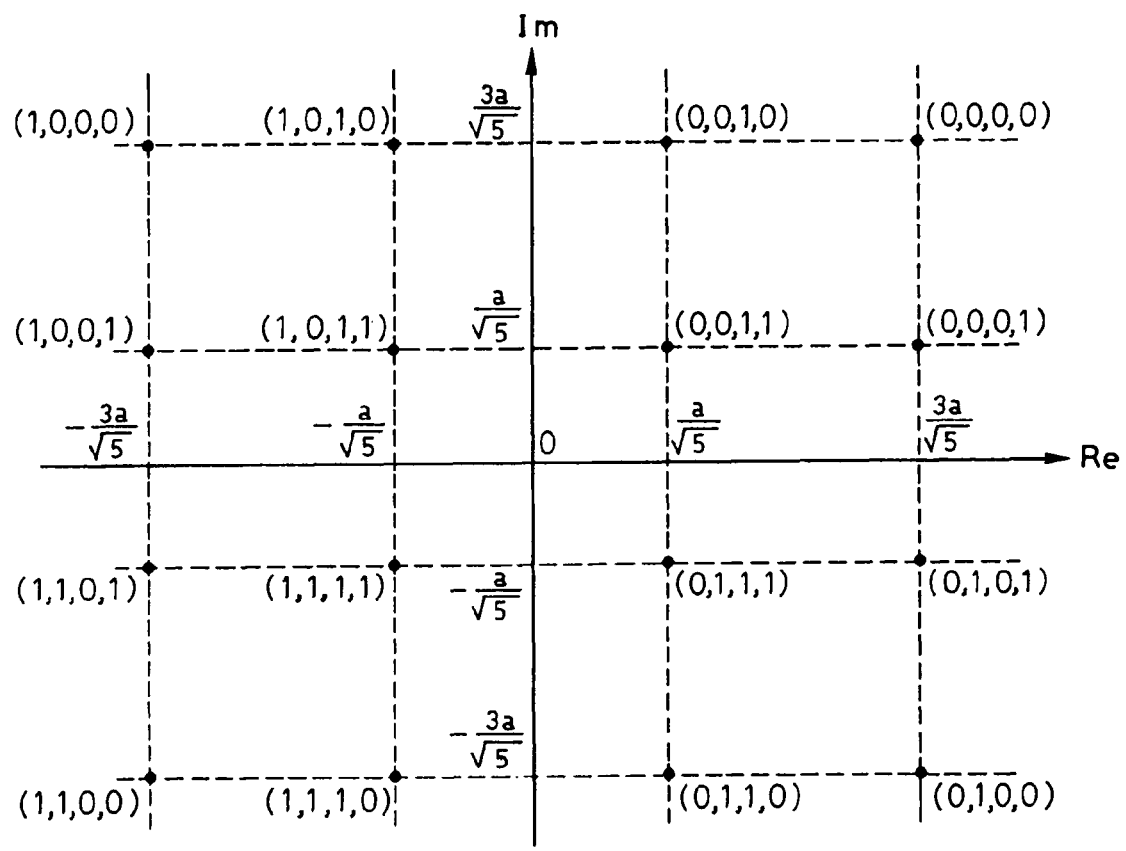
FIG. 11 is a graph showing correspondence of respective signal points on a complex plane, and 4-bit input signals.

According to each incorporated 4-bit value, a symbol point on a complex plane as shown in FIG. 11 is chosen, and each real part (Re) and imaginary part (Im) are outputted. FIG. 6 shows a timing chart of the operation.

When the bit rate is 120 kbps and QoS is high, four subcarriers are assigned to the input signal X2 and the QPSK with a low error rate is used as a modulation system. In this case, an output of the serial/parallel converter 102 also becomes four complex numbers at 15 kbps (it corresponded to four subcarriers).

In the serial/parallel converter 102, as shown in FIG. 3, data is inputted into the shift register 701 driven with a clock having a frequency equal to a data rate. An parallel output of the shift register 701 is set every 2 bits, and is inputted into the QPSK generating circuits 702, 703, 704, and 705 respectively to be incorporated with a clock (Symbol CLOCK) equal to a symbol rate.

According to the incorporated value of 2 bits, a symbol point on a complex plane as shown in FIG. 8 is chosen, and each real part (Re) and an imaginary part (Im) are outputted. A timing chart of the operation is shown in FIG. 7.

Similarly, if the QoS of the input signal Xn is not so high and its bit rate is 90 kbps, a sub carrier is assigned. In addition, when a modulation system is a 64-value QAM, an output of the serial/parallel converter 103 also becomes one complex number at 15 ksps (it corresponded to one sub carrier).

As described above, an adequate modulation system and the number of subcarriers to be assigned can be determined from the bit rate and QoS, and the symbol rates of all subcarriers can be set to the same rate, 15 kHz.

As described above, subcarriers and a modulation system are assigned for every communication channel, and 512 complex data symbols (at the symbol rate of 15 kbps) in total are obtained. In this case, if a communication channel is insufficient and a sub carrier is surplus, the sub carrier can be made not to be modulated, that is, to be a complex number (0+j0).

Thus, the sequence of the alignment of 512 pieces of parallel complex data obtained in this manner is replaced by the randomizer 104. This operation is performed per symbol. The randomizer 104, as shown in FIG. 4, replaces the sequence every symbol with a control signal (for example, 8 bits). If the control signal is 8 bits, 256 kinds of replacement can be performed. In FIG. 4, although the input signals X510 and X511 are connected to Y510 and Y511 as it is, this supposes the control channel.

The control channel is to transmit symbol synchronization and information about a randomization pattern to the receiving side. Hence, it facilitates an initial access to transmit it as it is without performing randomization.

The discrete inverse Fourier transformer 105 processes 512 pieces of randomized parallel complex data A' to obtain 512 sets of I and Q parallel data B. The parallel/serial converter 106 converts this result into a serial signal C. The parallel/serial converter 106 makes a real part before transformation be an I signal, makes an imaginary part be a Q signal, and outputs them to the transmitter 107 at the sample rate of 15 ksps×512=7.68 Msps. The transmitter 107 performs the orthogonal modulation of the I and Q baseband signals, and outputs them from the antenna 115.

Figure 12:
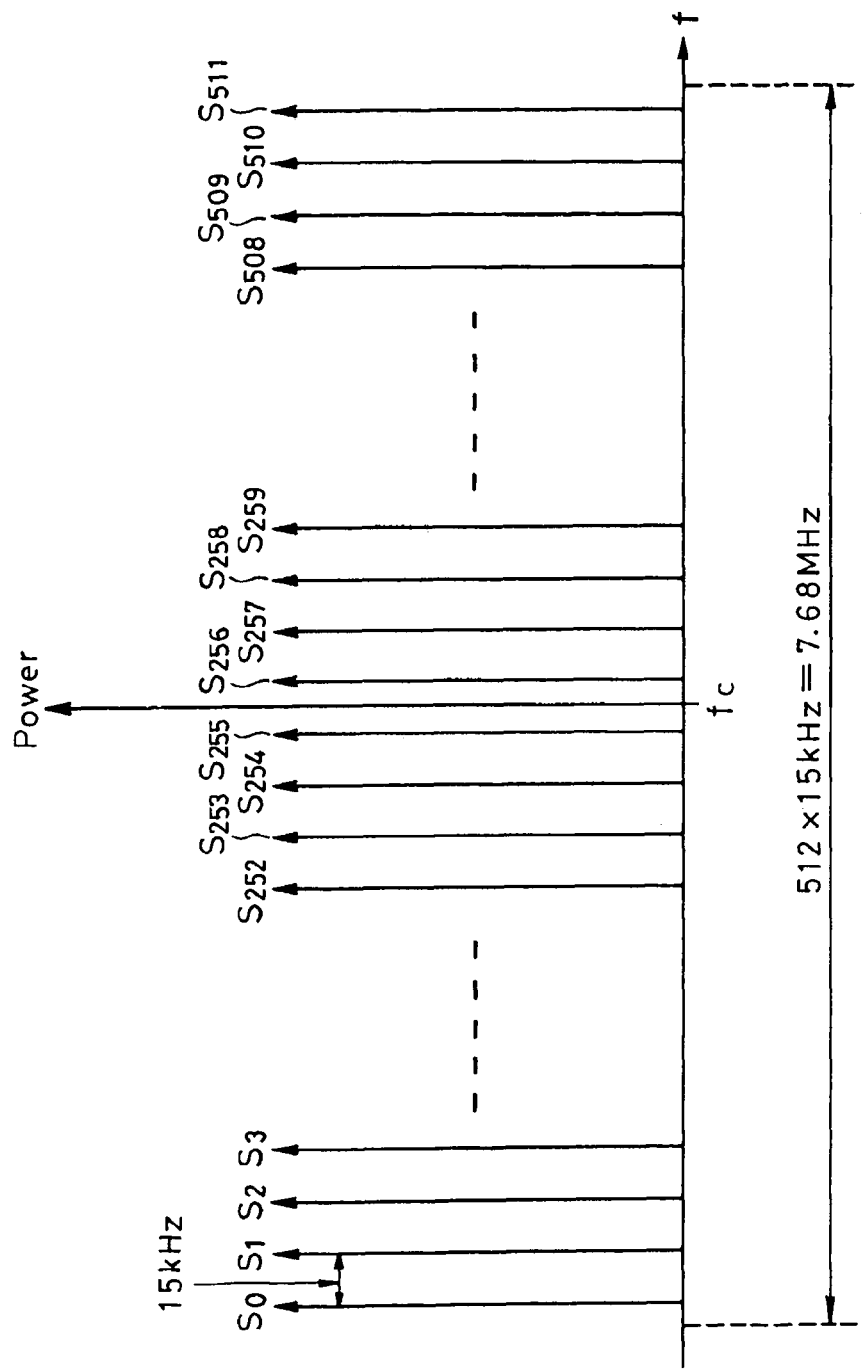
FIG. 12 is a diagram showing the allocation of subcarriers in a transmitter signal.

FIG. 12 shows the allocation of the subcarriers in a transmitter signal. As shown in FIG. 12, each interval between subcarriers is equal to 15 kHz that is the symbol rate, and the number of subcarriers is 512. Therefore, bandwidth is 15 kHz×512=7.68 MHz.

Next, the operation of the receiving side will be described. The receiving side receives the high frequency signal transmitted from the transmitting side with the antenna 116, and performs orthogonal demodulation with the receiver 108 to generate a baseband signal (I and Q) D. The receiving side samples this at the rate of 7.68 Msps with the serial/parallel converter 109 respectively to generate a parallel signal E that consists of 512 sets of I (real part) and Q (imaginary part) signals. The discrete Fourier transformer 110 receives this signal to output 512 complex numbers.

These data F' express signal points of corresponding subcarriers on a complex plane. The de-randomizer 111 receives this result, and restores the sequence of the subcarriers that is changed in the randomizer 104.

The de-randomizer 111 replaces the sequence per symbol with the control signal (for example, 8 bits), as shown in FIG. 5. If the control signal is 8 bits, 256 kinds of replacement can be performed. In FIG. 5, although the input signals Y510 and Y511 are connected to X510 and X511 as it is, this supposes the control channel.

The control channel is to transmit symbol synchronization and information about a randomization pattern to the receiving side. Hence, it facilitates an initial access to transmit them as they are without performing randomization.

The result F of the de-randomization expresses signal points of corresponding subcarriers on a complex plane. The corresponding bit data is restored from these signal points and the modulation systems of respective subcarriers, and is decoded and outputted to the original signals Y1 and Y2, ..., Yn with the parallel/serial converters 112, 113, and 114.

Thus, it becomes possible by performing the above processing operation to transmit a plurality of communication channels, whose bit rates and QoS are different from one another, via one OFDM line.

Figure 9:
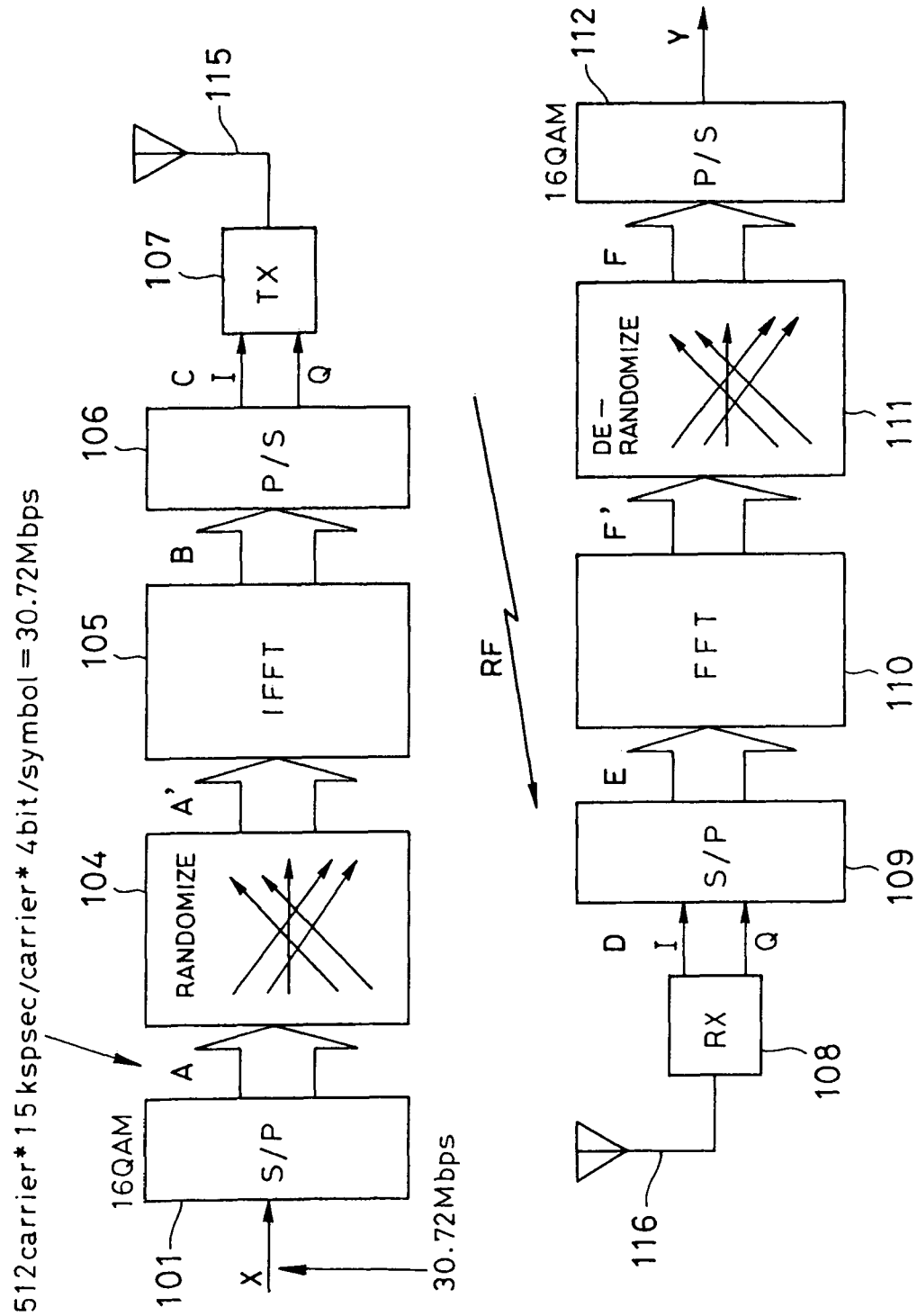
FIG. 9 is a block diagram showing the structure of an orthogonal frequency division multiplex modem circuit according to another embodiments of the present invention.

FIG. 9 is a block diagram showing the structure of an orthogonal frequency division multiplex modem circuit according to another embodiment of the present invention. In FIG. 9, the structure of the orthogonal frequency division multiplex modem circuit with a single channel is shown.

That is, the orthogonal frequency division multiplex modem circuit according to this embodiment of the present invention comprises a transmitting side consisting of a serial/parallel converter (S/P) 101, a randomizer 104, a discrete inverse Fourier transformer (IFFT) 105, a parallel/serial converter (P/S) 106, and a transmitter (TX) 107, and a receiving side consisting of a receiver (RX) 108, a serial/parallel converter (S/P) 109, a discrete Fourier transformer (FFT) 110, a de-randomizer 111, and a parallel/serial converter (P/S) 112.

The orthogonal frequency division multiplex modem circuit according to embodiment of the present invention is primarily intended to transmit a plurality of communication channels with different bit rates and QoS via one OFDM line. However, with depending on the case, only one communication channel can be passed preferentially.

For example, when it is necessary to relay digital Hi-Vision TV broadcasting, it becomes necessary to assign all subcarriers to this. In such a case, it is also conceivable to stop other communication channels with lower priorities temporarily and to use all subcarriers for one preference channel. Hence, the orthogonal frequency division multiplex modem circuit according to this embodiment of the present invention has the above-described structure.

Thus, the present invention includes also adaptively determining the assignment of subcarriers and modulation systems according to the priorities, bit rates, and QoS of communication channels.

Moreover, it is not desirable that difference of mean signal power arises between the subcarriers whose modulation systems differ. The present invention includes also making the mean signal power of all subcarriers uniform by adjusting peak values of symbols.

As described above, the present invention has an advantage that, the orthogonal frequency division multiplex modem circuit which uses a plurality of subcarriers for communication, and transmits and receives a plurality of communication channels can multiplex and transmit signals, whose bit rates and QoS are different from one another, via one OFDM line by assigning each of sub carrier groups, into which the plurality of subcarriers is divided, to each of the plurality of communication channels.

What is claimed is:

1. An orthogonal frequency division multiplex modem system which uses a plurality of subcarriers for communication and transmits and receives a plurality of communication channels, wherein one or more of said plurality of subcarriers are assigned to each one of said plurality of communication channels, said system comprising: in a transmission side thereof, a randomizer which randomly changes the order of the sequence of the alignment of said plurality of subcarriers on a frequency axis.

2. The orthogonal frequency division multiplex modem system according to claim 1, wherein the number of subcarriers assigned to each of a plurality of the communication channels are adaptively changed.

3. The orthogonal frequency division multiplex modem system according to claim 2, wherein all subcarriers are assigned to a single channel according to necessity, and the communication on other channels are stopped during the assigning.

4. The orthogonal frequency division multiplex modem system according to claim 1, wherein the number of the subcarriers assigned to each of a plurality of the communication channels are changed according to the QoS (Quality of Service).

5. The orthogonal frequency division multiplex modem system according to claim 4, wherein a modulation system applied to each group of subcarriers is changed according to the QoS which is necessary for the corresponding communication channel.

6. The orthogonal frequency division multiplex modem system according to claim 5, wherein the changeable modulation system is at least any one of the phase modulation of BPSK (Binary Phase Shift Keying), QPSK (Quadrature Phase Shift Keying), and QAM (Quadrature Amplitude Modulation), and a symbol point on a phase plane is changed according to the QoS.

7. The orthogonal frequency division multiplex modem system according to any one of claims 1-6, wherein the processing for randomizing positions of the respective subcarriers is updated every symbol.

8. The orthogonal frequency division multiplex modem system according to claim 5, wherein the peak values of symbols are determined to keep the transmission power of each subcarrier constant regardless of the modulation system.

9. The orthogonal frequency division multiplex modem system according to claim 1, further comprising, in a receiving side thereof, a de-randomizer which restores the alignment of subcarriers to the order of sequence of the alignment before it is changed in the transmitting side.

10. The orthogonal frequency division multiplex modem system according to claim 9, wherein the processing for randomizing positions of the respective subcarriers is updated every symbol.

11. An transmission system of an orthogonal frequency division multiplex modem system which uses a plurality of subcarriers for communication and transmits and receives a plurality of communication channels, wherein one or more subcarriers are assigned to each of a plurality of the communication channels, and a randomizer which randomly changes the order of the sequence of the alignment of subcarriers on a frequency axis is included.

12. The transmission system according to claim 11, wherein the number of the subcarriers assigned to each of a plurality of the communication channels are adaptively changed.

13. The transmission system according to claim 12, wherein all subcarriers are assigned to a single channel according to necessity, and the communication on other channels are stopped during the assigning.

14. The transmission system according to claim 11, wherein the number of the subcarriers assigned to each of a plurality of the communication channels are changed according to QoS (Quality of Service).

15. The transmission system according to claim 14, wherein a modulation system applied to each group of subcarriers is changed according to the QoS which is necessary for the corresponding communication channel.

16. The transmission system according to claim 15, wherein the changeable modulation system is at least any one of the phase modulation of BPSK (Binary Phase Shift Keying), QPSK (Quadrature Phase Shift Keying), and QAM (Quadrature Amplitude Modulation), and a symbol point on a phase plane is changed according to the QoS.

17. The transmission system according to any one of claims 11-16, wherein the processing for randomizing positions of the respective subcarriers is updated every symbol.

18. The transmission system according to claim 15, wherein the peak values of symbols are determined to keep the transmission power of each subcarrier constant regardless of the modulation system.

19. A receiving system of an orthogonal frequency division multiplex modem system which uses a plurality of subcarriers for communication and transmits and receives a plurality of communication channels, the receiving system comprising:
   a receiver for receiving a signal from an orthogonal frequency division multiplex modulator transmitting a plural of communication channels;
   a demodulator for demodulating the signal; and
   a de-randomizer which restores the alignment of subcarriers to the order of sequence of the alignment before it is randomly changed in a transmitting side.

20. An orthogonal frequency division multiplex communication method that uses a plurality of subcarriers for communication and transmits and receives a plurality of communication channels, the communication method comprising the steps of:
   assigning one or more subcarriers to each of a plurality of communication channels;
   changing randomly, the order of the sequence of the alignment of subcarriers on a frequency axis; and
   restoring the alignment of subcarriers to the order of sequence of the alignment before it is changed.

21. The orthogonal frequency division multiplex communication method according claim 20, wherein the number of subcarriers assigned to each of a plurality of the communication channels are adaptively changed.

22. The orthogonal frequency division multiplex communication method according to claim 20, wherein the number of the subcarriers assigned to each of a plurality of the communication channels are changed according to the QoS (Quality of Service).

23. The orthogonal frequency division multiplex communication method according to claim 22, wherein the method further comprises the step of modulating each group of subcarriers, said modulation is changed according to the QoS which is necessary for the corresponding communication channel.

24. The orthogonal frequency division multiplex communication method according to claim 23, wherein the changeable modulation is at least any one of the phase modulation of BPSK (Binary Phase Shift Keying), QPSK (Quadrature Phase Shift Keying), and QAM (Quadrature Amplitude Modulation), and a symbol point on a phase plane is changed according to the QoS.

25. The orthogonal frequency division multiplex communication method according to any one of claims 20-24, wherein the step of changing randomly the order of the sequence of the respective subcarriers is updated every symbol.

26. An orthogonal frequency division multiplex transmission method which uses a plurality of subcarriers for communication and transmits and receives a plurality of communication channels, the transmission method comprises the steps of:
   assigning one or more subcarriers to each of a plurality of the communication channels;
   changing randomly the order of the sequence of the alignment of subcarriers on a frequency axis.

27. The transmission system according to claim 26, wherein the number of the subcarriers assigned to each of a plurality of the communication channels are adaptively changed.

28. The transmission system according to claim 26, wherein the number of the subcarriers assigned to each of a plurality of the communication channels are changed according to QoS (Quality of Service).

29. The transmission system according to claim 28, wherein the method further comprises the step of modulating each group of subcarriers, said modulation is changed according to the QoS which is necessary for the corresponding communication channel.

30. The transmission system according to claim 29, wherein the changeable modulation is at least any one of the phase modulation of BPSK (Binary Phase Shift Keying), QPSK (Quadrature Phase Shift Keying), and QAM (Quadrature Amplitude Modulation), and a symbol point on a phase plane is changed according to the QoS.

31. The transmission system according to any one of claims 26-30, wherein the step of changing randomly the order of the sequence of the respective subcarriers is updated every symbol.

32. An orthogonal frequency division multiplex receiving method which uses a plurality of subcarriers for communication and transmits and receives a plurality of communication channels, the receiving method comprising the steps of:
   receiving a signal from an orthogonal frequency division multiplex modulator transmitting a plural of communication channels;
   demodulating the signal; and
   restoring the alignment of subcarriers to the order of sequence of the alignment before it is randomly changed in a transmitting side.

33. An orthogonal frequency division multiplex modem system which uses a plurality of subcarriers for communication and transmits and receives a plurality of communication channels, wherein one or more subcarriers are assigned to each of a plurality of communication channels, the modem system comprising a randomizer which randomly assigns subcarriers to each communication channel.

34. The orthogonal frequency division multiplex modem system according to claim 33, wherein the subcarriers randomized in the order of the sequence of the alignment are assigned to the communication channel.

35. A transmission system of an orthogonal frequency division multiplex modem system which uses a plurality of subcarriers for communication and transmits and receives a plurality of communication channels, wherein one or more subcarriers are assigned to each of a plurality of the communication channels, the transmission system comprising a randomizer which randomly assigns subcarriers to each communication channel.

36. The transmission system according to claim 35, wherein the subcarriers randomized in the order of the sequence of the alignment are assigned to the communication channel.

37. A receiving system of an orthogonal frequency division multiplex modem system which uses a plurality of subcarriers for communication and transmits and receives a plurality of communication channels, the receiving system comprising:

a receiver for receiving a signal from an orthogonal frequency division multiplex modulator transmitting a plural of communication channels;

a demodulator for demodulating the signal; and a de-randomizer which restores the sequence of the subcarriers randomly changed in a transmitting side.

38. An orthogonal frequency division multiplex communication method that uses a plurality of subcarriers for communication and transmits and receives a plurality of communication channels, the communication method comprising the steps of:

randomly assigning one or more subcarriers to each of a plurality of communication channels; and restoring the sequence of the subcarriers randomly changed in a transmitting side.

39. The orthogonal frequency division multiplex communication method according to claim 38, wherein the subcarriers randomized in the order of the sequence of the alignment are assigned to the communication channel.

40. An orthogonal frequency division multiplex transmission method which uses a plurality of subcarriers for communication and transmits and receives a plurality of communication channels, the transmission method comprises randomly assigning one or more subcarriers to each of a plurality of the communication channels.

41. The orthogonal frequency division multiplex transmission method according to claim 40, wherein the subcarriers randomized in the order of the sequence of the alignment are assigned to the communication channel.

42. An orthogonal frequency division multiplex receiving method which uses a plurality of subcarriers for communication and transmits and receives a plurality of communication channels, the receiving method comprising:

receiving a signal from an orthogonal frequency division multiplex modulator transmitting a plural of communication channels;

demodulating the signal; and restoring the sequence of the subcarriers randomly changed in a transmitting side.

* * * * *